United States Patent Office 2,890,105
Patented June 9, 1959

2,890,105
SOLVENT MEDIUM FOR THE ANTHRAQUINONE PROCESS FOR THE PRODUCTION OF HYDROGEN PEROXIDE

James K. Farrell, Syracuse, N.Y., assignor to Allied Chemical Corporation, New York, N.Y., a corporation of New York No Drawing. Application May 5, 1954
Serial No. 427,876
8 Claims. (Cl. 23—207)

This invention relates to the production of hydrogen peroxide by reduction and oxidation of a quinone compound and more particularly refers to a new and improved solvent medium in which the quinone compound is subjected to reduction and oxidation.

The anthraquinone process for the production of hydrogen peroxide consists of hydrogenating the quinone compound and oxidizing the hydroquinone compound thus formed back to the initial quinone compound. Since the quinone compound and, following hydrogenation, the resultant hydroquinone compound are solids at the temperature of the process, the quinone compounds are generally dissolved in a solvent, desirably a mixed solvent of two constituents consisting of a constituent capable of dissolving the quinone form and a constituent capable of dissolving the hydroquinone form. The result of employing more than one constituent in the solvent is that the working material (the quinone and corresponding hydroquinone compounds) in solution can be oxidized and reduced in cyclic fashion in single phase without separation of either form of the working material. The quinone compounds which may be employed for hydrogenation and oxidation to produce hydrogen peroxide are generally well known in the art and include anthraquinone and derivatives of anthraquinone such as methyl-, ethyl-, propyl-, butyl-, chloro-, and bromo-anthraquinones. Aromatic compounds such as benzene, toluene and xylene are the solvent constituents for maintaining the anthraquinone compound in solution. Alcohols having from 5 to 12 carbon atoms in the molecule, as for example amyl alcohol, cyclohexanol, methyl cyclohexanol, dimethyl cyclohexanol, octyl alcohol, nonyl alcohol and decyl alcohol are employed as the solvent constituent for maintaining the anthrahydroquinone compound in solution.

One of the principal objections to the anthraquinone process for producing hydrogen peroxide has been the extremely large volumes of expensive working solution which must be handled in order to produce a relatively small amount of inexpensive product. Production costs are seriously affected because of the great size of the equipment necessary and because of the precautions which must be taken to prevent solution losses. It is, therefore, evident that any improvement which will reduce the volume of solution to be recycled will also reduce the cost appreciably.

The process operated in Germany during the war (described in P.B. Reports 395, 1737, and 4336) produced only about 5.5 grams per liter of hydrogen peroxide in the working solution. The solvents used were equal volumes of benzene and higher secondary alcohols ($C_7$–$C_{11}$) which permitted them to carry only 100 grams per liter ethyl anthraquinone in solution. Thus for every volume of hydrogen peroxide produced, almost 200 volumes of working solution had to be cycled.

One of the principal reasons why the Germans found it necessary to operate at such a low potential peroxide concentration is the insolubility of the hydrogenated form of the ethylanthraquinone. Aromatic hydrocarbons such as benzene, toluene and xylene, will dissolve on the order of 20–25% ethylanthraquinone. However, the corresponding hydroquinone is soluble in the same solvents to the extent of only about 1–5%. Therefore, as pointed out in the patent literature, a second solvent for the reduced form is necessary. Alcohols such as methylcyclohexanol, octyl and nonyl alcohols have been most generally recommended. Even using these solvents, the hydroquinone form is soluble only to about 10% so it is necessary to limit the quanity of autoxidizable compound in the working solution to that which can be held in solution on reduction. This is a limiting factor in the process and accounts for the low concentration of 5.5 grams per liter $H_2O_2$ utilized by the Germans.

An object of the invention is to provide a solvent medium which has increased dissolving power for both reduced and oxidized forms of alkylated anthraquinone.

Another object of the present invention is to provide a more efficient method of producing hydrogen peroxide by employing an improved solvent medium for dissolving the quinone compounds whereby greater yields per pass of hydrogen peroxide are produced with consequent decrease in volume of working solution to be recycled.

Other objects and advantages will be apparent from the following description.

We have found that a solvent medium containing 10% to 60% of the ketone compound corresponding to the general formula

wherein R and $R_1$ are selected from the group consisting of aryl and alkyl radicals having from 1 to 10 carbon atoms per radical and wherein the sum total of the carbon atoms in R and $R_1$ are not less than 7 and not more than 16; with the balance made up of an aromatic hydrocarbon preferably xylene, and an aliphatic alcohol of 5 to 12 carbon atoms preferably octanol-2, have increased dissolving power for both the reduced and oxidized forms of alkylated anthraquinone permitting increased yields per pass of hydrogen peroxide of the order of 10–15 or higher grams per liter of working solution.

Examples of ketone compounds as the solvent constituent in the working solution are acetophenone, 3-octanone, 2-butanone-1-phenyl, 2-propanone-1-phenyl, 2-propanone-1-3 diphenyl, 7-tridecanone, diisoamyl ketone, di-p-tolyl ketone, 3-decanone, 3-nonanone, ethyl isoamyl ketone, propionaphthone, 3-hendecanone, propriophenone, 2-nonanone, 2-octanone, 4-decanone, and acetanaphthone. The preferred ketone compounds of the present invention correspond to the formula

wherein R is a phenyl radical and $R_1$ is an alkyl radical of from 1 to 3 carbon atoms.

The ketone compounds have the ability to augment the solvent power of both the aromatic constituent, e.g. xylene, for the quinone form and the alcohol constituent, e.g., octanol for the corresponding hydroquinone form. This synergistic effect makes it practical to attain high yields per pass of the order of 10–15 grams per liter $H_2O_2$ based on the working solution, thereby materially reducing cost of operation. The low vapor pressure of the preferred ketones such as acetophenone or benzophenone result in lower solvent losses. In addition the ketones of the present invention have chemical stability, i.e. substantially inert under operating conditions, water insolubility, and are relatively non-volatile, non-expensive, and non-toxic under the conditions of operation.

In carrying out the operation of the present invention conventional procedure and apparatus may be employed. More specifically a working solution is first prepared consisting of an alkylated anthraquinone, as for example 2-ethylanthraquinone dissolved in a solvent medium, a mixed solvent of three constituents consisting of a constituent capable of dissolving the quinone form such as aromatic hydrocarbon, e.g. xylene, a constituent capable of dissolving the hydroquinone form such as an alcohol, e.g. octanol-2, and a synergistic solvent such as the ketones of the present invention, e.g. acetophenone. The mixture of quinone compound and solvents is termed working solution and preferably contains from about 10–25% quinone compound, 10–60% ketone compound, with the balance made up of the aromatic hydrocarbon and alcohol solvents. A preferred working solution composition is within the range of 10–25% ethylanthraquinone, 10–30% xylene, 25–60% acetophenone and 10–35% octanol-2. An illustrative example of the composition of a typical working solution would be 14% 2-ethylanthraquinone, 13% xylene, 43% acetophenone and 30% capryl alcohol.

The working solution, ethylanthraquinone-solvent mixture, is introduced into a reducing chamber maintained at a temperature within the range of about 15–50° C. under substantially atmospheric pressure of about 1–5 p.s.i.g. To the working solution is added a hydrogenation catalyst such as Raney nickel or palladium supported on a suitable medium. The amount of catalyst required is approximately 0.01–10% by weight based on the quinone present in the working solution. Hydrogen is forced in intimate contact with the body of working solution containing suspended catalyst thereby reducing the anthraquinone to the hydroanthraquinone as illustrated by the following equation:

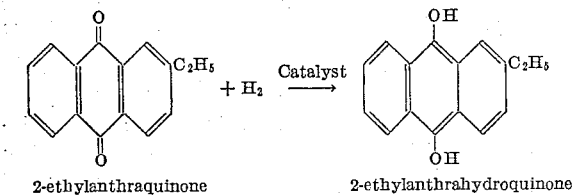

2-ethylanthraquinone      2-ethylanthrahydroquinone

During the hydrogenation reaction a side reaction leads to the addition of hydrogen to the aromatic nucleus of anthraquinone forming tetrahydroanthraquinone. The tetrahydroanthraquinone compound may be used as a working compound in the working solution although the oxidation of the tetrahydroanthraquinone compound proceeds with greater difficulty than the oxidation of anthraquinone. We have found that the presence of tetrahydroanthraquinone compounds in a solvent medium containing the ketone solvent constituents of the present invention permits higher potential hydrogen peroxide levels to be attained. The term "alkylated anthraquinones" as used in the claims is intended to include the tetrahydroanthraquinone compounds.

After hydrogenation suspended catalyst is separated from the working solution and the working solution is then oxidized by passing oxygen or an oxygen-containing gas such as air in intimate contact with the working solution at room temperatures or higher, preferably about 30–35° C. A catalyst is not necessary for the oxidation. The oxidation reaction may be exemplified by the following equation:

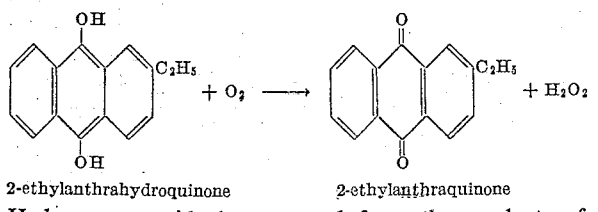

2-ethylanthrahydroquinone      2-ethylanthraquinone

Hydrogen peroxide is separated from the products of the oxidation reaction by scrubbing them with water. After extraction of hydrogen peroxide, the working solution is recycled for further reaction with hydrogen.

Merely for comparative purposes reduction and oxidation of 2-ethylanthraquinone in conventional solvents, xylene and octanol-2, was carried out as follows: a working solution was prepared consisting of 13% 2-ethylanthraquinone, 43.5% xylene and 43.5% octanol-2. Hydrogen was passed in contact with the working solution maintained at a temperature of 30° C. When the anthraquinone was hydrogenated to produce a potential hydrogen peroxide concentration of 6 grams per liter of working solution, the ethylanthrahydroquinone started to precipitate out of solution and at a potential peroxide concentration of 7.5 grams per liter there was appreciable precipitation of ethylanthrahydroquinone. Thus the production of a hydrogen peroxide concentration of in excess of about 5–6 grams per liter working solution cannot be tolerated due to the precipitation of ethylanthrahydroquinone from the working solution.

The following examples illustrate the present invention.

*Example 1*

A working solution consisting of 13% 2-ethylanthraquinone, 13.1% xylene, 43.5% acetophenone and 34.4% octanol by weight formed a clear solution at room temperature and had a specific gravity of 0.9330 at 20° C. Parenthetically the specific gravity of a working solution must be sufficiently lower or higher than water in order to effect the efficient separation of hydrogen peroxide from the working solution by extraction with water. The specifiv gravity of the working solution should be less than about 0.97 or greater than about 1.08; specific gravities very near that of water cause difficulty in the extraction procedure. The working solution containing a palladium catalyst supported on activated carbon was maintained at a temperature of 30° C. and hydrogen was bubbled through the working solution for a period of 40 minutes. The potential hydrogen peroxide concentration of the working solution was 17.3 grams per liter. At no time during the hydrogenation reaction was there any precipitation from the solution. The working solution was then oxidized at a temperature of 35° C. and the oxidized reaction products extracted with water resulting in the production of in excess of 15 grams per liter hydrogen peroxide. Thus it will be noted that the synergistic effect of acetophenone solvent medium increases the yield of hydrogen peroxide almost threefold as compared with the use of conventional solvents.

*Example 2*

A working solution consisting of a mixture of 15% 2-ethylanthraquinone, 10% xylene, 45% acetophenone and 30% by weight octanol-2 together with palladium catalyst supported on activated carbon was subjected in a manner similar to that described in Example 1 to hydrogenation for a period of 46 minutes at a temperature of 30° C. The potential hydrogen peroxide concentration of the working solution was found to be 20.4 grams per liter of working solution. No precipitate was formed during hydrogenation.

*Example 3*

A working solution consisting of 15% 2-ethylanthraquinone, 10% xylene, 50% acetophenone, and 25% octanol-2 by weight was maintained at a temperature of 30° C. and hydrogenated for a period of 54 minutes in a manner similar to Example 2. The potential hydrogen peroxide concentration of the working solution was found to be 17.0 grams per liter of working solution. No precipitate was formed during hydrogenation.

*Example 4*

A working solution consisting of 10% 2-ethylanthraquinone, 15% xylene, 40% methyl hexyl ketone and 35% octanol-2 by weight together with palladium catalyst supported on activated carbon was subjected to contact with a stream of hydrogen gas for a period of 17 minutes at a temperature of 30° C. The potential hydrogen peroxide concentration of the working solution was found to be 9.1 grams per liter of working solution. No precipitate was formed during hydrogenation.

*Example 5*

A working solution consisting of 12.8% 2-ethylanthraquinone, 8.3% 2-ethyl-tetrahydroanthraquinone, 11.9% xylene, 39.5% acetophenone and 27.5% capryl alcohol by weight formed a clear solution at room temperature and had a specific gravity of 0.963 at 24° C. This working solution was hydrogenated using 5% palladium on activated carbon as catalyst at room temperature. A potential hydrogen peroxide content of 25.2 grams per liter was obtained and the solution did not precipitate in three hours at 15° C. even when standing over the catalyst.

Although certain preferred embodiments of the invention have been disclosed for purpose of illustration it will be evident that various changes and modifications may be made therein without departing from the scope and spirit of the invention.

I claim:

1. In a process for the manufacture of hydrogen peroxide by reduction and oxidation of non-halogenated alkylated anthraquinones dissolved in a mixed solvent including a solvent constituent for the quinone form and a solvent constituent for the hydroquinone form of the alkylated anthraquinone, the improvement which comprises employing as an additional constituent of the mixed solvent a ketone compound corresponding to the general formula

wherein R and $R_1$ are selected from the group consisting of aryl and alkyl radicals having from 1 to 10 carbon atoms per radical and wherein the sum total of the carbon atoms in R and $R_1$ are not less than 7 and not more than 16.

2. In a process for the manufacture of hydrogen peroxide by reduction and oxidation of non-halogenated alkylated anthraquinones dissolved in a mixed solvent including a solvent constituent for the quinone form and a solvent constituent for the hydroquinone form of the alkylated anthraquinone, the improvement which comprises employing as an additional constituent of the mixed solvent in an amount of 10% to 60% by weight of the mixed solvent a ketone compound corresponding to the formula

wherein R and $R_1$ are selected from the group consisting of aryl and alkyl radicals having from 1 to 10 carbon atoms per radical and wherein the sum total of the carbon atoms in R and $R_1$ are not less than 7 and not more than 16.

3. In a process for the manufacture of hydrogen peroxide by reduction and oxidation of non-halogenated alkylated anthraquinones dissolved in a mixed solvent which comprises employing as the mixed solvent an aromatic hydrocarbon solvent constituent, an aliphatic hydrocarbon alcohol solvent constituent of 5 to 12 carbon atoms, and a ketone solvent constituent in an amount of 10% to 60% by weight of the mixed solvent, said ketone constituent corresponding to the general formula

wherein R and $R_1$ are selected from the group consisting of aryl and alkyl radicals having from 1 to 10 carbon atoms per radical and wherein the sum total of the carbon atoms in R and $R_1$ are not less than 7 and not more than 16.

4. In a process for the manufacture of hydrogen peroxide by reduction and oxidation of non-halogenated alkylated anthraquinones dissolved in a mixed solvent including a solvent constituent for the quinone form and a solvent constituent for the hydroquinone form of the alkylated anthraquinone, the improvement which comprises employing acetophenone as an additional constituent of the mixed solvent.

5. In a process for the manufacture of hydrogen peroxide by reduction and oxidation of non-halogenated alkylated anthraquinones dissolved in a mixed solvent including a solvent constituent for the quinone form and a solvent constituent for the hydroquinone form of the alkylated anthraquinone, the improvement which comprises employing methyl hexyl ketone as an additional constituent of the mixed solvent.

6. In a process for the manufacture of hydrogen peroxide by reduction and oxidation of non-halogenated alkylated anthraquinones dissolved in a mixed solvent including a solvent constituent for the quinone form and a solvent constituent for the hydroquinone form of the alkylated anthraquinone, the improvement which comprises employing benzophenone as an additional constituent of the mixed solvent.

7. In a process for the manufacture of hydrogen peroxide by reduction and oxidation of non-halogenated alkylated anthraquinones dissolved in a mixed solvent including a solvent constituent for the quinone form and a solvent constituent for the hydroquinone form of the alkylated anthraquinone, the improvement which comprises employing as an additional constituent of the mixed solvent a ketone compound corresponding to the general formula

wherein R is a phenyl radical and $R_1$ is an alkyl radical of from 1 to 3 carbon atoms.

8. In a process for the manufacture of hydrogen peroxide by reduction and oxidation of non-halogenated alkylated anthraquinones dissolved in a mixed solvent which comprises employing as the mixture of alkylated anthraquinone and solvent: 10–25% 2-ethylanthraquinone, 10–30% xylene, 10–35% octanol-2, and 25–60% acetophenone.

References Cited in the file of this patent

UNITED STATES PATENTS

| | | |
|---|---|---|
| 2,215,883 | Riedl et al. | Sept. 24, 1940 |
| 2,660,580 | Von | Nov. 24, 1953 |
| 2,739,042 | Corey et al. | Mar. 20, 1956 |

OTHER REFERENCES

Williams et al.: "An Introduction to Organic Chemistry," 5th ed., 1948, pages 90–91, 554.

Ruggli et al.: "Helvetica Chimica Acta," vol. 12, pp. 79–80 (1929).